(12) United States Patent
Lin et al.

(10) Patent No.: US 8,816,240 B2
(45) Date of Patent: Aug. 26, 2014

(54) CLADDING SYSTEM AND METHOD FOR APPLYING A CLADDING TO A POWER GENERATION SYSTEM COMPONENT

(75) Inventors: Dechao Lin, Greenville, SC (US); Yan Cui, Greenville, SC (US); Brian Lee Tollison, Greenville, SC (US); Srikanth Chandrudu Kottilingam, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 208 days.

(21) Appl. No.: 13/197,905

(22) Filed: Aug. 4, 2011

(65) Prior Publication Data

US 2013/0032577 A1 Feb. 7, 2013

(51) Int. Cl.
*B23K 9/04* (2006.01)

(52) U.S. Cl.
USPC .................................. 219/76.12; 219/76.14

(58) Field of Classification Search
USPC ........................................ 219/76.12, 76.14
See application file for complete search history.

(56) References Cited

U.S. PATENT DOCUMENTS

| 4,647,749 | A * | 3/1987 | Koshy ........................ 219/76.14 |
| 5,756,966 | A * | 5/1998 | Offer ........................ 219/124.03 |
| 6,013,890 | A | 1/2000 | Hulsizer |
| 6,103,996 | A * | 8/2000 | Yoneda et al. .......... 219/137 PS |
| 6,405,435 | B1 * | 6/2002 | Konter et al. ................ 29/889.7 |
| 7,180,028 | B2 | 2/2007 | Flood et al. |
| 7,306,670 | B2 * | 12/2007 | Beck et al. ........................ 117/3 |
| 2008/0210347 | A1 * | 9/2008 | Morin et al. .................. 148/527 |
| 2011/0198317 | A1 | 8/2011 | Lin |
| 2011/0226390 | A1 * | 9/2011 | Chen et al. .................... 148/527 |

FOREIGN PATENT DOCUMENTS

| GB | 900337 A | | 7/1962 |
| GB | 2453945 A | | 4/2009 |
| JP | 2007210012 A | * | 8/2007 |
| SU | 419334 A1 | | 3/1974 |

OTHER PUBLICATIONS

Tim Heston, Two processes sometimes are better than on: Pushing the envelope with hybrid cladding, welding; Laser Welding Tech Cell—TheFabricator.com (found at http://www.thefabricator.com/article/laserwelding/two-processes-sometimes-are-better-than-one), Feb. 9, 2010, pp. 1-3.

(Continued)

*Primary Examiner* — Henry Yuen
*Assistant Examiner* — Ayub Maye
(74) *Attorney, Agent, or Firm* — McNees Wallace & Nurick LLC

(57) ABSTRACT

A cladding system and method for applying a cladding to a power generation system component including a first weld bead, a second weld and a filler bead. The first weld is deposited on the surface with a first energy source and solidified to form a first weld bead. The second weld is deposited on the surface adjacent to the first weld bead with the first energy source, wherein depositing the second weld creates a surface depression between the first weld bead and second weld. The filler bead is simultaneously deposited in the surface depression with a second energy source while depositing the second weld bead. The second weld and the filler bead are solidified to form the cladding bead.

16 Claims, 6 Drawing Sheets

(56) References Cited

OTHER PUBLICATIONS

Daniel L. Winterscheidt, Dual Hot Wire/Cold Wire Gas Tungsten Arc Cladding Procedure Increases Cladding Deposition Rate (found at http://www.ncemt.ctc.com/index.cfm?fuseaction=stories.successDetails&id=138), Feb. 8, 2011; pp. 1-2.

Chris Kahlich, Better cladding, better inspection: Industry advances with hot-wire GTAW cladding and inspection (found at http://www.thefabricator.com/article/arcwelding/better-cladding-better-inspection), Oct. 14, 2010, pp. 1-6.

M. Nouri, Effect of Welding Parameters on Dilution and Weld Bead Geometry in Cladding, Journal of Materials Science & Technology, vol. 23, No. 6, Jan. 9, 2007; pp. 817-822.

Search Report and Written Opinion from corresponding EP Application No. 12178547.1-2302 dated Nov. 29, 2012.

* cited by examiner

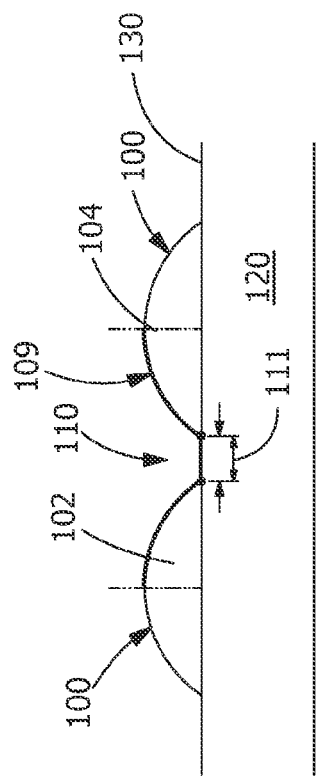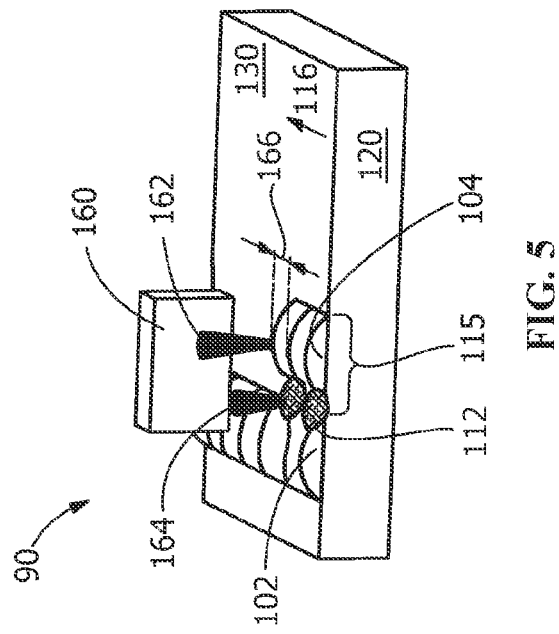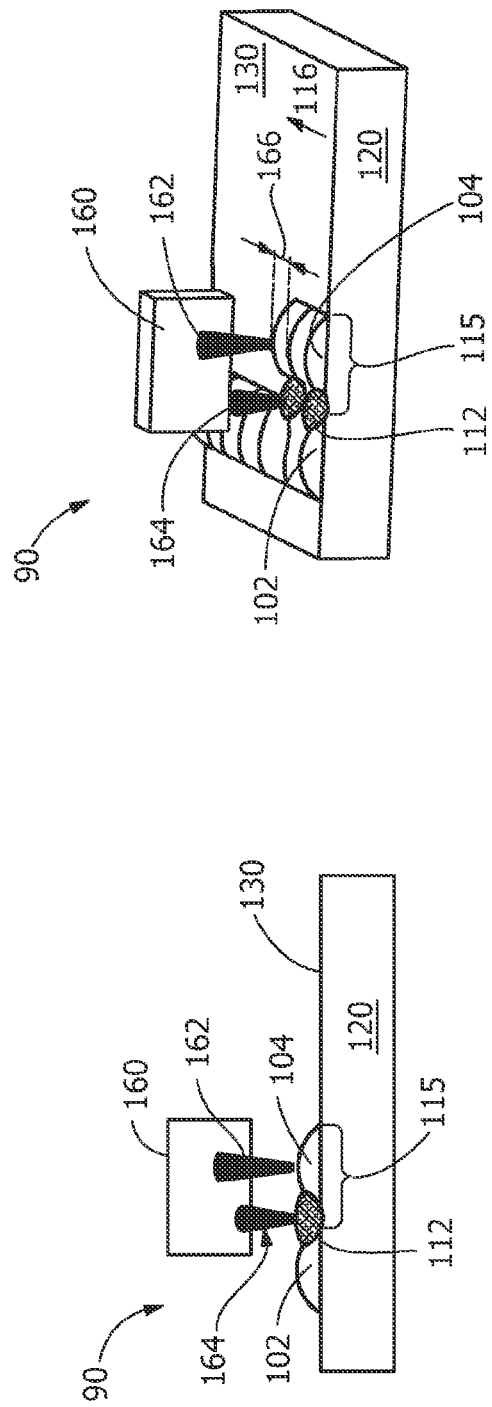

CLADDING SYSTEM AND METHOD FOR APPLYING A CLADDING TO A POWER GENERATION SYSTEM COMPONENT

FIELD OF THE INVENTION

This disclosure relates to cladding technology generally, and specifically, to a cladding system and process and method for applying a cladding to a component at increased speeds.

BACKGROUND OF THE INVENTION

As shown in FIG. 1, cladding of a filler metal on a base metal can be accomplished by welding with a bead-by-bead basis. To ensure the seamlessness of the weld overlay, overlapping of one bead on the previous one is necessary so that the desired overlay thickness can be obtained when the material is removed from the outer surface. The more overlap of the beads, the less material that needs to be removed to provide the smooth surface on the component. FIG. 1 shows a typical three overlapped beads. After machining, a weld overlay with height 54 and width 60 can be obtained, as shown in FIG. 2. If the spacing of each of the beads 10 (bead-to-bead) is extended which results in less overlap 40 between the beads 10, more materials will be removed to keep the cladding surface even, which results in a reduced height of the weld overlay. If there is no overlap built up between any two beads, there will be no weld overlay left after machining the beads for an even surface.

Therefore, a cladding system and process and method for applying a cladding that does not suffer from the above drawbacks are desirable in the art.

SUMMARY OF THE INVENTION

According to an exemplary embodiment of the present disclosure, a method for applying a cladding to a component is provided. The method includes providing the component having a surface, depositing a first weld on the surface with a first energy source. The first weld is solidified to form a first weld bead. The second weld is deposited on the surface adjacent to the first weld bead with the first energy source. Depositing the second weld creates a surface depression between the first weld bead and the second weld. Simultaneously, a filler bead is deposited in the surface depression with a second energy source while depositing the second weld. The second weld and the filler bead are solidified to form a cladding bead.

According to another exemplary embodiment of the present disclosure, a cladding system is provided. The cladding system includes a component having a surface and a first weld, the first weld being solidified to form a first weld bead. The cladding system includes a second weld deposited with the first energy source, wherein the second weld is deposited adjacent the first weld bead forming a surface depression. The cladding system includes a filler bead simultaneously deposited with a second energy source in the surface depression formed between the first weld bead and the second weld bead. Simultaneously depositing the second weld bead and the filler bead with the first and second energy sources provides a cladding deposit on the surface of the component.

According to another exemplary embodiment of the present disclosure, a method for cladding a power generation system component is provided. The cladding process includes providing the power generation system component having a surface, depositing a first weld on the surface with a gas metal arc welder, and solidifying the first weld to form a first weld bead on the surface. Next, a second weld is deposited on the surface adjacent to the first weld bead with the gas metal arc welder. Depositing the second weld creates a surface depression between the first weld bead and the second weld. The method includes simultaneously depositing a filler bead in the surface depression using a gas tungsten arc welder while depositing the second weld. The method includes solidifying the second weld and the filler bead to form a cladding bead.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 3 is a schematic illustration of the first and second weld beads including a surface depression located therebetween of the present disclosure.

FIG. 4 is a schematic illustration of the cladding system of the present disclosure.

FIG. 5 is a perspective view of the cladding system of the present disclosure.

Wherever possible, the same reference numbers will be used throughout the drawings to represent the same parts.

DETAILED DESCRIPTION OF THE INVENTION

Provided is a cladding system and process and method for applying a cladding, that does not suffer from the drawbacks in the prior art and provides a wider cladding area and faster cladding speeds.

Figure 1:
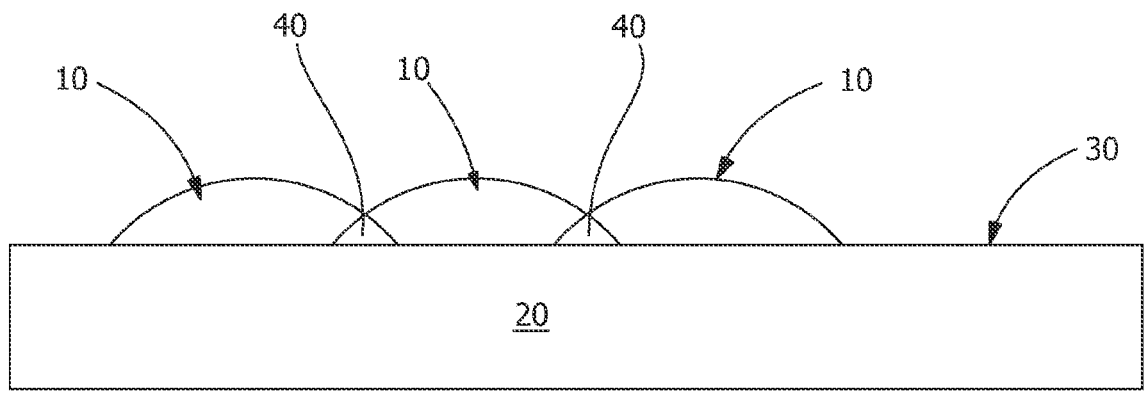
FIGS. 1 and 2 are schematic illustrations of a known cladding process used to clad a component surface.
Figure 2:
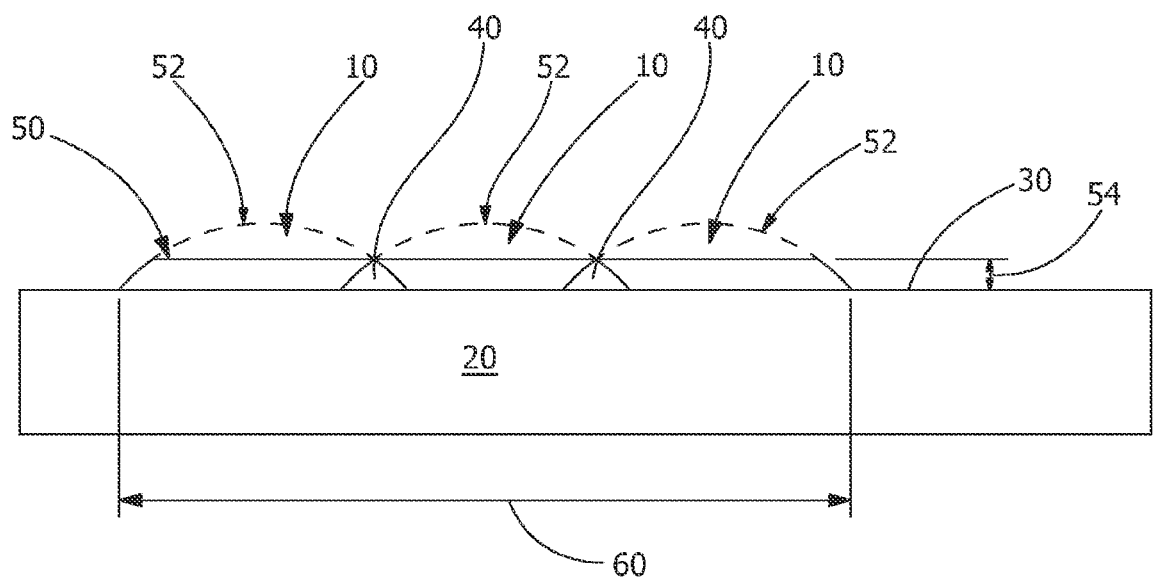

As shown in FIGS. 1 and 2 a traditional cladding process using a plurality of weld beads 10 is provided. As shown in FIG. 1, each of the weld beads 10 is deposited overlapping the previous weld bead 10 on the surface 30 of a component 20. In one embodiment, the overlap of the weld beads 10 is approximately ten to approximately thirty percent of the total area of each of the weld beads 10 The overlap 40 or overlapping the weld beads 10 provides a continuous cladding on the surface 30 of the component 20. As shown in FIG. 2, to provide a smooth finish to the cladding, a portion 52 of each of the weld beads 10 is removed (shown as dotted lines and) to provide the final clad surface 50 having a cladding thickness 54 and an overall cladding width 60 on the component 20. In the traditional cladding process, the more overlap 40 of the weld beads 10, the less material 52 that needs to be removed from the weld beads 10 to arrive at a desired thickness 54 of the final clad 50 with even surface; however, more weld beads 10 are needed to provide the desired cladding width 60 on the component 20. In the cladding process illustrated in FIGS. 1 and 2, the less overlap 40 of the weld beads 10, the greater the cladding width 60 on the surface; however the thickness 54 is greatly reduced when material 52 is removed to provide the final clad surface 50.

As shown in FIGS. 3-7, a cladding system 90 (see FIG. 4) is provided that does not suffer from the drawbacks in the prior art and provides a wider cladding area and faster cladding speeds. The cladding system 90 includes a component 120 having a surface 130, a first weld bead 102, a second weld bead 104, and a filler bead 112 (see FIGS. 4, 5, and 6). The first and second weld beads 102 and 104 are formed with a first energy source 162. The first weld bead 102 and the second weld bead 104 are adjacent one another and form a surface depression 110 having a surface area 109 (see FIG. 3). As shown in FIGS. 4 and 5, a filler bead 112 is simultaneously deposited with a second energy source 164 while the second weld bead 104 is being deposited with the first energy source 162. The surface depression 110 contains the filler bead 112 formed with the second energy source 164 (see FIGS. 4 and 5). Simultaneously depositing the filler bead 112 and the second weld bead 104 with the first and second energy sources 162 and 164 provides a cladding bead 115 on the surface 130 of the component 120 (see FIG. 4). The cladding bead 115 is a combination of the solidified second weld bead 104 and the filler bead 112 (see FIG. 4). In one embodiment, the first energy source 162 of the cladding system 90 is a gas metal arc welder (GMAW) having a consumable electrode and shielding gas or a gas tungsten arc welder (GTAW) having a consumable filler wire. In one embodiment, the second energy source 164 of the cladding system 90 includes a shielding gas and is a gas metal arc welder (GMAW) having a consumable electrode or a gas tungsten arc welder (GTAW) having a consumable filler wire. In one embodiment, the first weld bead includes a filler bead 112 in the first pass.

In one embodiment, the shielding gas is, for example, but not limited to, argon, helium, argon-helium, argon-hydrogen, argon-carbon dioxide, argon-oxygen, with or without hydrogen and nitrogen. In one embodiment, the consumable electrode is based primarily on the composition of the metal being welded and the material surface conditions. In another embodiment, the consumable electrode is, but not limited to, non-ferrous and ferrous alloys, such as but not limited to aluminum, copper, nickel, titanium, silver, gold, platinum, brass, bronze, phosphor bronze, stainless steel, superalloy, combinations thereof, and alloys thereof. In one embodiment, the consumable feeding wire is, but not limited to, aluminum, iron, cobalt, copper, nickel, stainless steel, carbon steel, titanium, gold, silver, palladium, platinum, alloys thereof, and combinations thereof. In one embodiment, the cladding layer 114 that results from the process is substantially the same as the component material. In an alternative embodiment, the cladding layer 114 is a substantially different material than the component material.

In one embodiment, the component 120 is selected from a base metal, which includes, but is not limited to, aluminum, titanium, steel, stainless steel, brass, copper, nickel, beryllium-copper, superalloy, alloys thereof and combinations thereof. In another embodiment, the component 120 is any substrate suitable for a cladding, for example, but not limited to, gas turbine components, aircraft engine components, and other various metal components requiring a cladding.

FIG. 3 is a schematic illustration of the weld beads 100 deposited on the surface 130 of the component 120. In operation, a first weld is deposited on the surface 130 with a first energy source 162 and allowed to solidify and form a first weld bead 102 on the surface 130 of the component 120. In one embodiment, the first energy source 162 used to deposit the first weld is a gas metal arc welder (GMAW) having a consumable electrode and shielding gas (see FIG. 4). Next, a second weld is deposited on the surface of the component 120 adjacent to the first weld bead 102. The second weld is deposited using the first energy source 162 to create surface depression 110 between two beads 100 (see FIG. 3). The second weld is solidified to form a second weld bead 104, the surface depression formed between the first weld bead 102 and the second weld bead 104 (see FIG. 3). The distance 111 between the first and second weld beads 102 and 104 is such that the first and second weld beads 102 and 104 have little or no overlap and such that the surface depression 110 forms a groove therebetween. Generally the surface area 109 of the surface depression 110 is from the middle of one weld bead 100 to the middle of the adjacent weld bead 100 (see FIG. 3). In one embodiment, the first weld bead 102 and the second weld bead 104 are adjacent to each other forming the surface depression 110 but do not overlap. In another embodiment, the first weld bead 102 and second weld bead 104 are adjacent to each other forming the surface depression 110 and the first and second weld beads 102 and 104 are slightly touching but not substantially overlapping. By substantially overlapping it is meant that at least 10 percent of the weld beads overlap (see FIGS. 1 and 2). In another embodiment, the distance 111 between the first and second weld beads 102 and 104 is between approximately 0 to approximately 10 millimeters or alternatively 0.2 millimeters to approximately 8 millimeters or alternatively approximately 0.5 millimeters to approximately 6.0 millimeters.

As shown in FIGS. 4 and 5, in one embodiment, a cladding system 90 includes a welding apparatus 160 having a first energy source 162 and a second energy source 164. In this embodiment, the first energy source 162 and the second energy source 164 are positioned at a distance 166 to prevent an arc disturbance. In another embodiment, the first energy source 162 and second energy source 164 are mounted separately and positioned at a distance 166 to prevent arc disturbance. As shown in FIGS. 4-8, the filler bead 112 is deposited in the surface depression 110 adjacent to the first weld bead 102 and second weld bead 104. In one embodiment, the first energy source 162 leads the second energy source 164 in the direction of cladding 116 (see FIG. 6).

Figure 6:
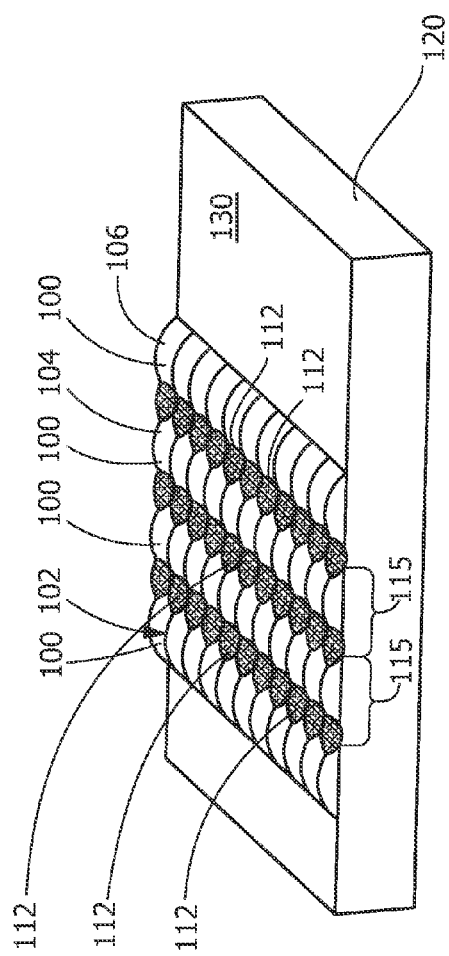
FIG. 6 is a perspective view of the first weld bead, the second weld bead and filler bead of the present disclosure.
Figure 7:
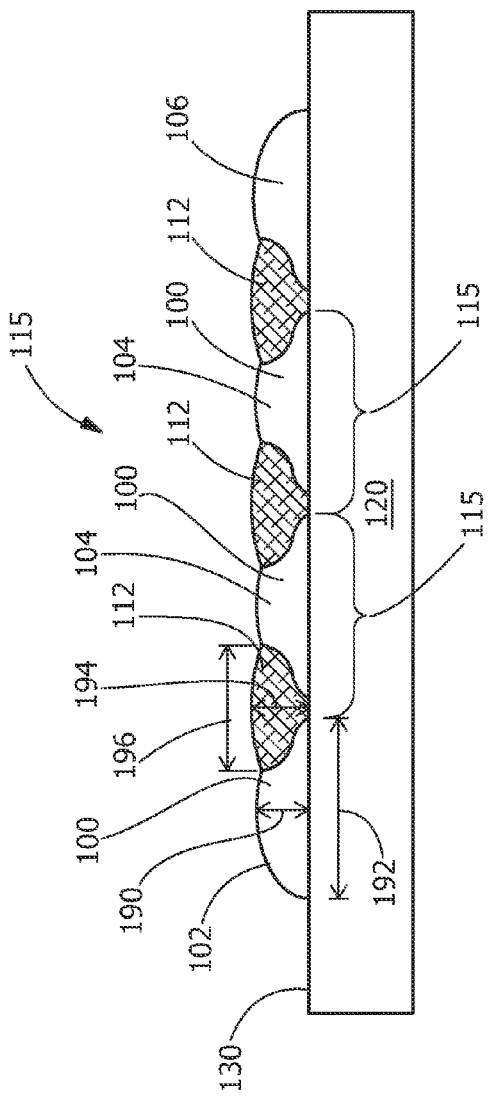
FIG. 7 is a schematic illustration of the cladding of the present disclosure.

As shown in FIGS. 6-7, after depositing the first weld bead 102, the second weld bead 104 and filler bead 112 therebetween, additional cladding beads 115 (a combination of the filler bead 112 and the second weld bead 104) up to an nth weld bead 106 and filler beads 112 are deposited on the surface 130 of the component 120 until the desired area is covered with the cladding 114. Each previous adjacent weld bead 100 is considered to be the first weld bead 102 for purposes of each successive pass on the component 120 to arrive at the desired surface area for the cladding 114. FIGS. 4 and 5 show a partial first pass and cladding 114 resulting from the cladding system 90 of the present disclosure. FIG. 5 show a first and second pass and cladding resulting from the cladding system 90 of the present disclosure.

As shown in FIG. 7, the weld bead 100 includes a first dimension 190 and a second dimension 192, respectively shown as height and width. The first dimension 190 and second dimension 192 of the weld bead 100 can be varied depending on the desired cladding thickness 170, cladding width 180 (see FIG. 8), and area on the surface 130 of the component 120 to be covered. In one embodiment, as depicted in FIG. 7, the first dimension 190 and second dimension 192 of the weld bead 100 are varied using different welding parameter settings (arc current, voltage and wire feeding speed) and consumable electrode sizes. In one embodiment, the first dimension 190 of the weld bead 100 is approximately 1.5 millimeters to approximately 10 millimeters or alternatively approximately 2.0 millimeters to approximately 8.0 millimeters or alternatively approximately 3.0 millimeters to approximately 6.0 millimeters. In one embodiment, the first dimension 190 of the weld bead 100 is constant throughout the cladding process, in which weld beads 100, 102, and 104 have identical or similar size. In another embodiment, the first dimension 190 of the weld bead 100 is varied during the cladding process. In one embodiment, the second dimension 192 of the weld bead is approximately 3.0 millimeters to approximately 20.0 millimeters or alternatively approximately 4.0 millimeters to approximately 15.0 millimeters, or alternatively approximately 5.0 millimeters to approximately 10.0 millimeters. In one embodiment, the second dimension 192 of the weld bead 100 is constant throughout the cladding process, in which weld beads 100, 102, and 104 have identical or similar sizes. In another embodiment, the second dimension 192 of the weld bead 100 is varied during the cladding process.

As shown in FIG. 7, the filler bead 112 includes a filler bead first dimension 194 and a filler bead second dimension 196, respectively shown as height and width. In one embodiment, the filler bead first dimension 194 and the filler bead second dimension 196 are varied depending on if the second energy source 164 is a GMAW having a consumable electrode or a gas tungsten arc welder (GTAW) having a consumable filler wire. In another embodiment, the filler bead first dimension 194 and filler bead second dimension 196 are varied using different consumable electrode materials or sizes or different consumable wire materials and wire sizes. In one embodiment, the filler bead first dimension 194 is approximately the same as the depth of the surface depression 110 or groove created by the first and second weld beads 102 and 104. In another embodiment, the filler bead first dimension 194 is approximately 0.5 millimeters to approximately 10 millimeters, or alternatively approximately 1.0 millimeters to approximately 8 millimeters, or alternatively approximately 1.2 millimeters to approximately 6 millimeters. In one embodiment, the filler bead first dimension 194 is constant throughout the cladding process. In another embodiment, the filler bead first dimension 194 is varied during the cladding process. In one embodiment, the filler bead second dimension 196 is approximately the same as the greatest width of the surface depression 110 or groove created by the first and second weld beads. In one embodiment, the filler bead second dimension 196 is approximately 1 millimeter to approximately 20 millimeters, or alternatively approximately 1.5 millimeters to approximately 15 millimeters, or alternatively approximately 2 millimeters to approximately 10 millimeters.

Figure 8:
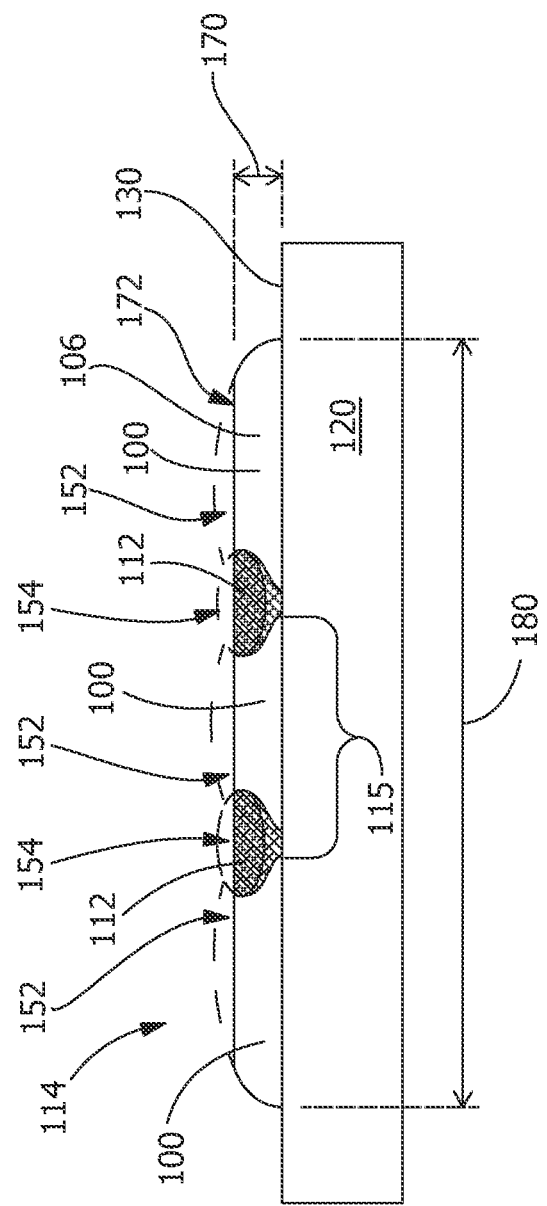
FIG. 8 is a schematic illustration of machining the cladding of the present disclosure.

In one embodiment, after the weld beads 100 and filler beads 112 have been deposited on the surface 130 of the component 120 and allowed to solidify, the cladding 114 is machined to provide a smooth clad surface 172 as shown in FIG. 8. A portion of material 152 from each of the weld beads 100 is removed and a portion or material 154 from each of the filler beads 112 is removed to provide the smooth clad surface 172, as shown in FIG. 8. The amount of material 152 and 154 that is removed from the weld beads 100 and filler beads 112 is substantially less material than that which would be removed using a traditional cladding process, as shown in FIGS. 1 and 2. The cladding thickness 170 and overall cladding width 180 on the surface 130 of the component 120 are greater than what can be achieved using traditional cladding methods. The use of the filler bead 112 allows for little or no overlap of the weld beads 100, thereby resulting in a greater cladding width 180 when the cladding 114 is machined to provide the smooth clad surface 172, as shown in FIG. 8.

Figure 9:
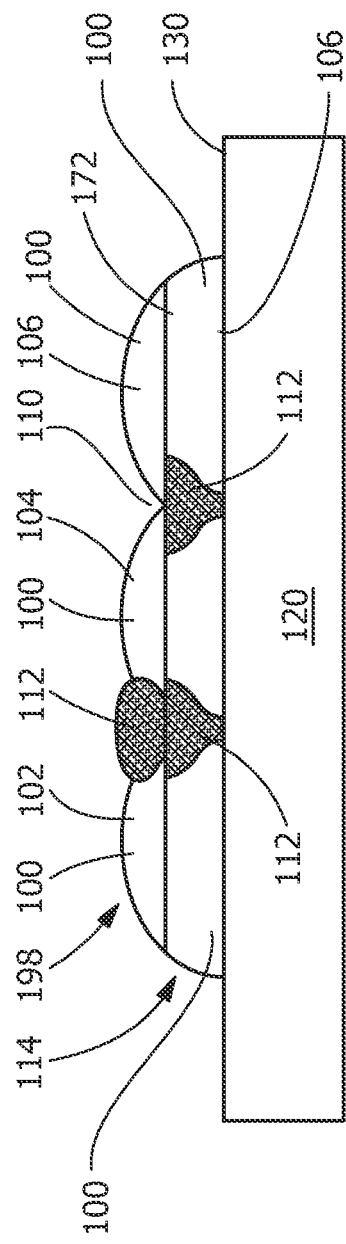
FIG. 9 is a schematic illustration of multiple cladding layers on the component of the present disclosure.

FIG. 9 is a schematic illustration of a plurality of cladding layers 140 on the surface 130 of a component 120. The weld beads 100 are deposited and the filler beads 112 are simultaneously deposited forming the first layer of cladding 114, as described above. The first layer of cladding 114 is optionally machined to provide a smooth clad surface 172. Next, a second layer of cladding 198 is provided to the clad surface 172. The second layer of cladding 198 is applied in the same manner as the first layer of cladding 114. The second layer of cladding 198 is applied by using a first energy source 162 to provide a first weld bead 102 on the clad surface 172. Next, a second weld bead 104 is deposited on the clad surface 172 adjacent to the first weld bead 102 with the first energy source 162. Depositing the second weld bead 104 creates a surface depression 110 between the first and second weld beads 102 and 104. A filler bead 112 is simultaneously deposited in the surface depression 110 with a second energy source 164. This process is repeated until the desired area on the component 120 is clad. In one embodiment, clad surface 172 is a machined flat surface. In another embodiment, clad surface is the surface on the cladding layer without machining. The final layer of cladding is optionally machined to provide a smooth cladding surface as described above in a manner shown in FIG. 8. This process can be repeated to provide any number of a plurality of cladding layer 140 to a component 120.

Figure 10:
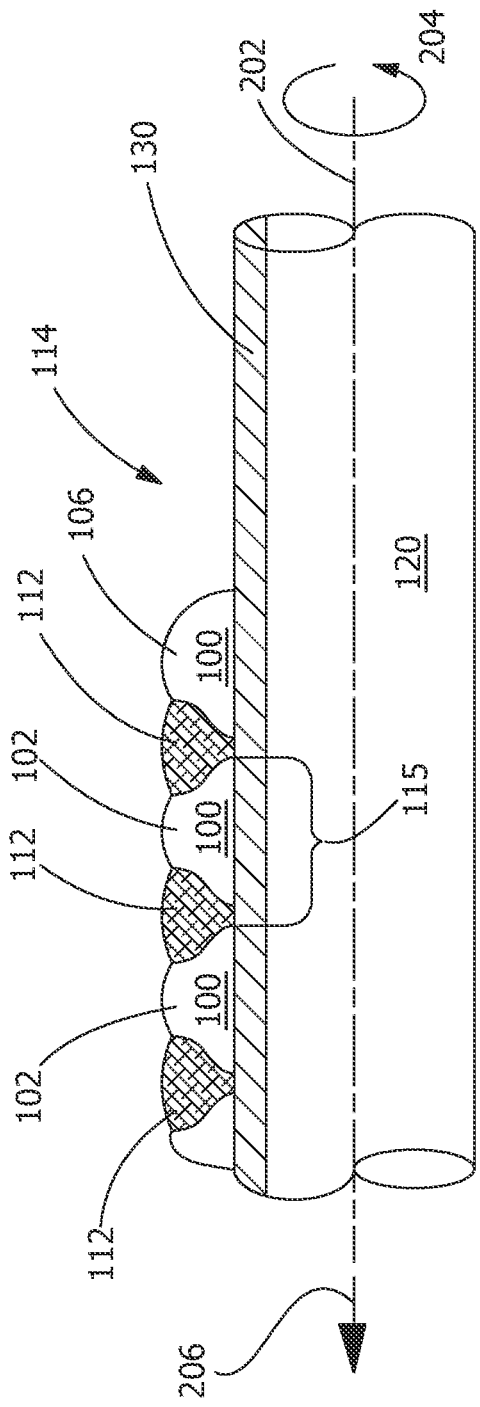
FIG. 10 is a schematic illustration of a cladding on a component having curved surface of the present disclosure.

FIG. 10 is a schematic illustration another embodiment of the present disclosure. As shown in FIG. 10, the cladding layer 114 applied to a pipe or component 120 having a curved profile. In this embodiment, the first energy source 162 and the second energy source 164 are held in a fixed position. The cladding layer 114 is applied by moving the pipe in the desired direction, shown by the arrow labeled 206. The component 120 is also rotated around an axis 202 the rotation can be clockwise or counter-clock wise (as shown by 204). In one embodiment, the component 120 exterior surface receives the cladding layer 114. In another embodiment, the interior surface (not shown) of the component 120 is clad using the same process.

Figure 11:
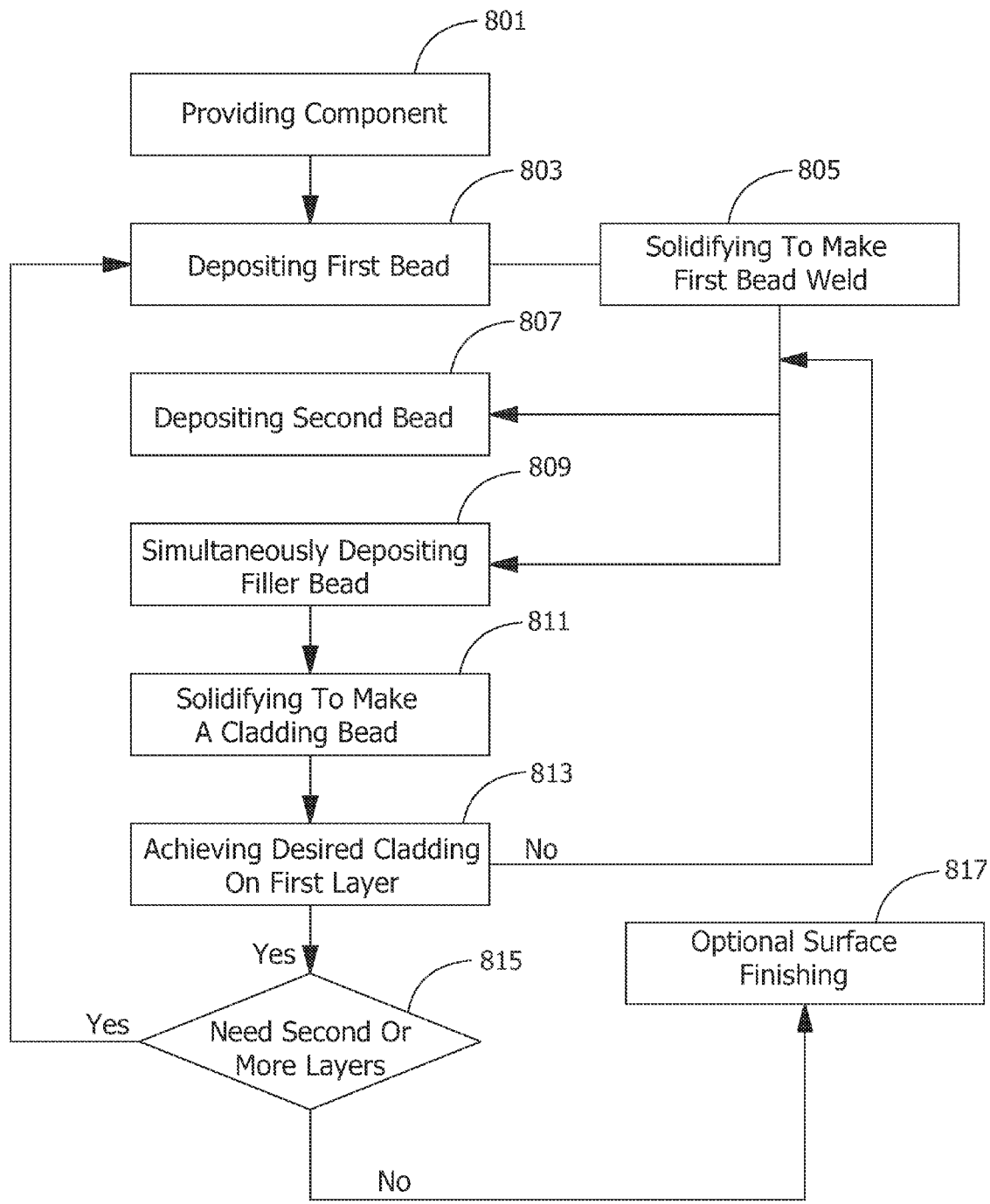
FIG. 11 is a flow diagram of the method for applying a cladding of the present disclosure.

FIG. 11 is a flow diagram of the method for applying a cladding 114 to a component of the present disclosure. A component 120 is provided, step 801 (see FIG. 3). A first weld is deposited on the surface 130 of the component 120 with a first energy source 162, step 803. The first weld is solidified to form the first weld bead 102, step 805 (see FIGS. 3 and 4). A second weld is deposited on the surface 130 of the component 120, adjacent to the first weld bead 102, with a second energy source 164, step 807 (see FIG. 5). The step of depositing, step 807 creates a surface depression 110 on the surface 130 of the component 120 between the first and second weld beads 102 and 104 (see FIG. 3). A filler bead 112 is simultaneously deposited in the surface depression 110 adjacent to both the first weld bead 102 and second weld bead 104, step 809 (see FIGS. 4 and 5). The second weld bead 104 and filler bead 112 are solidified to form the cladding bead 115 on the surface of the component 120, step 811 (see FIG. 6). In step 813, if the desired cladding 114 is not achieved, then the process is repeated returning back to the step of simultaneously depositing the second weld and the filler bead, steps 807 and 809. In step 813, if the desired cladding 114 is achieved on the surface 130 of the component 120, then to step 815. Step 815 evaluates if at least one additionally layer of cladding is needed, if not, on to step 817. If an additional layer of cladding 114 is needed, the process returns to step 803 of depositing the first bead on the previous layer of layer of cladding (see FIG. 9), and continues through the process as described above. Once it has been determined that no additional cladding layers are necessary, on to step 817. In step 817, optionally, the solidified cladding 114 on the surface 130 of the component 120 is machined to provide a smooth clad surface 136 on the component 120 (see FIG. 9).

EXAMPLE

Reference Example

A single weld bead of filler material Inconel 625 was deposited on the surface of Cr—Mo steel using a GMAW. The GMAW had the following settings: wire feeding speed of 200 inch per minute (ipm), voltage of 20 Volts (V) with weaving magnitude of 5 mm, and average 110 Amps (A) under the pulse mode. The welding speed used to make the single weld bead was 10 ipm. The single weld bead was measured using a stereoscope. The measurement of the single bead was about 10 millimeters wide and 2.8 mm high.

To calculate heat input, the following equation was used:

$$Q = \text{Efficiency} \times \left( \frac{60 \times I \times V}{1000 \times S} \right)$$

Where Q=heat input (kJ/in), V=voltage (V), I=current (A), S=welding speed (in/min), Efficiency for GMAW is 0.9, and for GTAW is 0.8. The heat input was calculated for making the single weld bead as 11.88 KJ/in. ((110A×20V×60)/(10 ipm×1000)×0.9=11.88 KJ/in.). The surface of the component was clad using a GMAW to deposit nine overlapping single weld beads. The width of the cladding on the surface of the component was 61 mm and the height of the cladding (after machining to provide an even surface) was 2.3 mm. The total heat input was 106.92 kJ/in, which is nine times the amount for a single weld bead (11.88 kJ×9=106.92 kJ/in).

Example 1

A cladding surface was prepared using the cladding system of the present disclosure. A GMAW was used to deposit a first weld bead and the remaining weld beads. The GMAW used in this example had the same setting of the reference example (filler material Inconel 625 was deposited on the surface of Cr—Mo steel using a GMAW): wire feeding speed of 200 inch per minute (ipm), voltage of 20 Volts (V) with weaving magnitude of 5 mm, and 110 Amps (A). The heat input for making a single weld bead is the same as the reference example above, 11.88 KJ/in. In addition, a GTAW process with filler metal feeding was used to simultaneously deposit the filler beads in the depression surface created by the GMAW adjacent weld beads. The GTAW had the following settings: welding speed 10 inch per minute (ipm), 10 Volts (V) with weaving and 80 Amps (A) with shielding gas of pure argon. Efficiency for GTAW=0.8. The heat input for each GTAW is 3.84 KJ/in ((80A×10V×60)/(10 ipm×1000)× 0.8=3.84 KJ/in) Using the cladding system and hybrid cladding method of the present disclosure only required 6 weld beads and 5 filler beads to clad 61 mm of the surface of the component. The total heat input for the hybrid cladding method and system was 90.48 kJ/in ((11.88 kJ/in×6 beads))+ (3.84 kJ/in×5 beads)=90.48 kJ/in). Using a single GMAW to complete a same clad has an approximately 15% higher heat input than the hybrid cladding method of the present disclosure. To calculate this, the total heat input of the GMAW only cladding was compared to the total heat input of the cladding method of the present disclosure. (106.92 kJ/in−90.48 kJ/in)/ 106.92 kJ/in=15.3%. Therefore, the hybrid cladding method of the present disclosure requires less heat input to complete a cladding overlay than conventional cladding methods using a single GMAW.

One advantage of an embodiment of the present disclosure is that it provides up to an approximately forty percent increase in the cladding speed over traditional cladding methods.

Another advantage of an embodiment of the present disclosure includes a method that provides an approximately 20 to approximately 40 percent greater overall cladding deposit width over traditional cladding methods.

Another advantage of an embodiment of the present disclosure includes a method that requires approximately 15% less heat input to provide the cladding over traditional cladding methods.

Another advantage of an embodiment of the present disclosure includes a time-saving method that increases the speed for cladding a surface.

Another advantage of an embodiment of the present disclosure includes a method that allows for faster cladding of a surface.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for applying a cladding to a component comprising: providing the component having a surface; depositing a first weld on the surface with a first energy source; solidifying the first weld forming a first weld bead on the surface; depositing a second weld on the surface adjacent to but not overlapping the first weld bead with the first energy source, wherein depositing the second weld creates a surface depression and a groove between the first weld bead and second weld; simultaneously depositing a filler bead in the surface depression and groove with a second energy source while depositing the second weld; positioning said first energy source and said second energy source at a distance to prevent an arc disturbance and solidifying the second weld and the filler bead to form the cladding bead.

2. The method of claim 1, wherein the first energy source is a gas metal arc welder having a consumable electrode and a shielding gas and wherein the second energy source includes a shielding gas and is a gas metal arc welder having a consumable electrode or a gas tungsten arc welder having a consumable filler wire.

3. The method of claim 1, wherein the method further includes machining the cladding to provide a smooth surface.

4. The method of claim 1, wherein the method provides an approximately 20 to approximately 40 percent greater overall cladding deposit width.

5. The method of claim 1, wherein the method requires approximately 15% less heat input to provide the cladding.

6. The method of claim 1, wherein the method is repeated to provide a plurality of cladding layers on the surface of the component.

7. The method of claim 6, wherein the method further includes machining between each cladding layer to provide a smooth surface.

8. The method of claim 1, wherein the cladding material is selected from material that is similar to the component material.

9. The method of claim 1, wherein the cladding material is selected from material including gold, silver, palladium, platinum, aluminum, stainless steel, copper, nickel, titanium, alloys thereof, and combinations thereof.

10. The method in claim 1, wherein the first weld bead and the second weld bead have approximately the same deposition size.

11. The method in claim 1, where the consumable filler wire is the same for the first energy source and the second energy second energy source.

12. The method in claim 1, wherein the component includes plates, pipes, and any curved profile.

13. A method of cladding a power generation system component comprising:
providing the power generation system component having a surface; depositing a first weld on the surface with a gas metal arc welder; solidifying the first weld to form a first weld bead; depositing a second weld on the surface adjacent to but not overlapping the first weld bead with the gas metal arc welder, wherein depositing the second weld creates a surface depression and a groove between the first weld bead and second weld; simultaneously depositing a filler bead in the surface depression and groove using a second gas tungsten arc welder while depositing the second weld; positioning said first energy source and said second energy source at a distance to prevent an arc disturbance and solidifying the second weld and the filler bead to form a cladding bead.

14. The method of cladding a power generation system component of claim 13, wherein the process further includes machining the cladding to produce a smooth surface.

15. The method of cladding a power generation system component of claim 13, wherein gas metal arc welder leads the gas tungsten arc welder in a direction of cladding.

16. The method of cladding a power generation system component of claim 13, wherein the cladding process is optionally repeated to form a plurality of cladding layers on the surface of the component.

* * * * *